(12) United States Patent
Hattori (10) Patent No.: US 9,793,783 B2
(45) Date of Patent: Oct. 17, 2017

(54) ROTOR OF ROTARY ELECTRIC MACHINE

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 296 days.

(21) Appl. No.: 14/749,041

(22) Filed: Jun. 24, 2015

(65) Prior Publication Data

US 2015/0381015 A1 Dec. 31, 2015

(30) Foreign Application Priority Data

Jun. 27, 2014 (JP) .................................. 2014-133240
Sep. 3, 2014 (JP) .................................. 2014-179437

(51) Int. Cl.
*H02K 9/00* (2006.01)
*H02K 9/19* (2006.01)
*H02K 1/27* (2006.01)
*H02K 1/32* (2006.01)

(52) U.S. Cl.
CPC ............. *H02K 9/19* (2013.01); *H02K 1/2766* (2013.01); *H02K 1/32* (2013.01)

(58) Field of Classification Search
CPC ........ H02K 1/276–1/2773; H02K 1/32; H02K 1/325; H02K 9/00–9/28
USPC ........................................................... 310/61
See application file for complete search history.

(56) References Cited

FOREIGN PATENT DOCUMENTS

| JP | 2006-067777 A | 3/2006 |
| JP | 2008086130 A | 4/2008 |
| JP | 2008-228522 A | 9/2008 |
| JP | 2008-228523 A | 9/2008 |
| JP | 2009-55737 A | 3/2009 |
| JP | 2013-013182 A | 1/2013 |

*Primary Examiner* — Ramon M Barrera
(74) *Attorney, Agent, or Firm* — Sughrue Mion, PLLC (57) ABSTRACT

A rotor related to the present invention is for a rotary electric machine. The rotor includes a rotor core and magnets. The rotor core has a plurality of core refrigerant passages. The core refrigerant passage each includes an inlet passage, a magnet cooling passage and an outlet passage. The inlet passage is configured such that a liquid refrigerant flows into the inlet passage from a shaft refrigerant passage. The magnet cooling passage is configured such that the liquid refrigerant flows into the magnet cooling passage from the inlet passage. The magnet cooling passage extends in an axial direction. The outlet passage is configured to flow the liquid refrigerant from the magnet cooling passage to a gap. An axial position of the outlet passage in the rotor core is at one place at a central position in the axial direction.

8 Claims, 7 Drawing Sheets

ROTOR OF ROTARY ELECTRIC MACHINE

INCORPORATION BY REFERENCE

The disclosure of Japanese Patent Application No. 2014-133240 and 2014-179437 filed on Jun. 27, 2014 and Sep. 3, 2014 including the specification, drawings and abstract is incorporated herein by reference in its entirety.

BACKGROUND OF THE INVENTION

1. Field of the Invention

The present invention relates to a rotor of a rotary electric machine, and particularly to a cooling structure thereof.

2. Description of Related Art

A rotor of a rotary electric machine, described in Japanese Patent Application Publication No. 2006-67777 (JP 2006-67777 A), is configured such that a cooling oil is supplied from a rotor shaft to a plurality of cooling oil passages formed in a rotor core so as to cool down magnets, and then, the cooling oil is discharged to a gap between a rotor outer peripheral surface and a stator.

In JP 2006-67777 A, each of the plurality of cooling oil passages contributes to cooling of the magnets. However, cooling oil passage outlets to the gap between the rotor outer peripheral surface and the stator are formed at several parts in an axial direction, so that the cooling oil flows out into the gap through the several parts in the axial direction. In a region sandwiched between the cooling oil passage outlets in the axial direction, cooling oils from the cooling oil passage outlets interfere with each other, so that the cooling oils are easy to be retained therein. As a result, the cooling oil retained in the gap serves as a rotational resistance to the rotor, which increases a drag loss.

SUMMARY OF THE INVENTION

The present invention provides a rotor which improves cooling performance of rotor magnets and which reduces a drag loss.

A rotor related to the present invention is for a rotary electric machine. A stator of the rotary electric machine is to be placed radially outside the rotor so as to be opposed to the rotor via a gap defined between the rotor and the stator. The rotary electric machine includes a rotor shaft. The rotor shaft is fixed to an inner peripheral side of the rotor. The rotor shaft has a shaft refrigerant passage. The rotor includes a rotor core and magnets. The rotor core has a plurality of core refrigerant passages. The core refrigerant passage each includes an inlet passage, a magnet cooling passage and an outlet passage. The inlet passage is configured such that a liquid refrigerant flows into the inlet passage from the shaft refrigerant passage. The magnet cooling passage is configured such that the liquid refrigerant flows into the magnet cooling passage from the inlet passage, the magnet cooling passage extending in an axial direction. The outlet passage is configured to flow the liquid refrigerant from the magnet cooling passage to the gap. An axial position of the outlet passage in the rotor core is at one place at a central position in the axial direction. The magnets are disposed in the rotor core along the axial direction.

According to the above configuration, it is possible to prevent the cooling oil from being retained in the gap between the rotor and the stator and to reduce a drag loss at the time when the rotor rotates. This makes it possible to cool down the magnets of the rotor entirely in the axial direction and to improve cooling performance of the magnets.

The magnet cooling passage may communicate with the inlet passage. The magnet cooling passage may have a first magnet cooling passage and a second magnet cooling passage. The first magnet cooling passage extends in the axial direction. The second magnet cooling passage communicates with the outlet passage and extending in the axial direction. The core refrigerant passage may have a communicating passage. The first magnet cooling passage communicates with the second magnet cooling passage via the communicating passage. And an axial position of the communicating passage may be placed axially outside an axial position of the inlet passage and an axial position of the outlet passage.

The axial position of the inlet passage in the rotor core may be at one place at a central position in the axial direction.

A radial position of the second magnet cooling passage may be placed radially outside a radial position of the first magnet cooling passage.

The rotor core may include a plurality of first core plates. The each first core plate may have a through hole. And the plurality of first core plates may be laminated in the axial direction, such that the through holes of the plurality of first core plates are connected to each other in the axial direction so as to form the magnet cooling passage.

The rotor core may include a second core plate. The second core plate may have the outlet passage. The first core plates may be placed on both sides of the second core plate in the axial direction.

The rotor core may include a plurality of core plates. One of the core plates which has the outlet passage may be placed at an axially central position of the rotor core.

The rotor core may include a plurality of core plates. One of the core plates which has the inlet passage may be placed at an axially central position of the rotor core.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a mode for carrying out the present invention (hereinafter referred to as "embodiment") with reference to the drawings.

Figure 1:
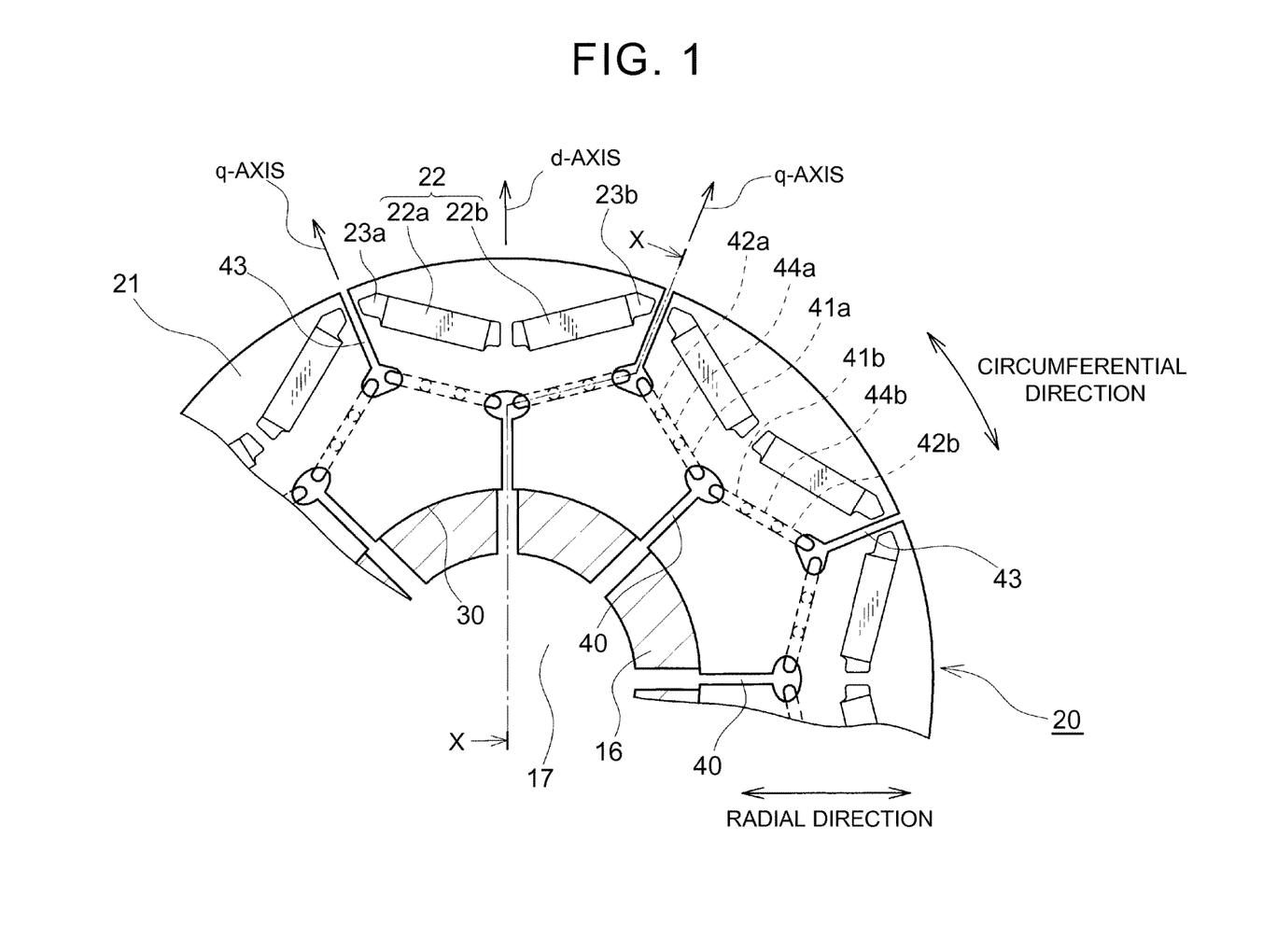
FIG. 1 is a cross-sectional view illustrating an exemplary configuration of a rotor 20 according to an embodiment of the present invention.
Figure 2:
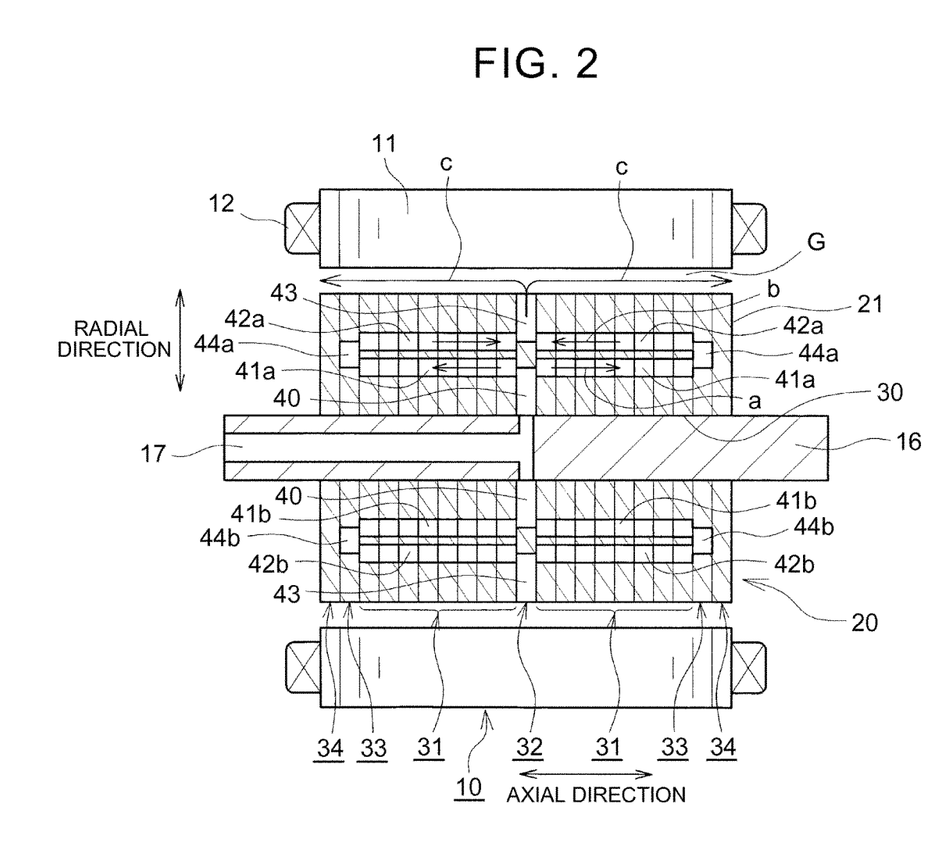
FIG. 2 is a sectional view of a rotary electric machine taken along a line X-X in FIG. 1.

FIGS. 1 to 6 are views each illustrating a schematic configuration of a rotary electric machine including a rotor 20 according to the embodiment of the present invention. FIG. 1 illustrates a cross-sectional view of the rotor 20, FIG. 2 is a sectional view of the rotary electric machine taken along a line X-X in FIG. 1, and FIGS. 3 to 6 illustrate exemplary configurations of core plates 31 to 34 constituting a rotor core 21. FIGS. 1, 3 to 6 illustrate only a configuration of a part of the rotor 20 in a circumferential direction, but a configuration of the remaining part that is not illustrated herein has the same configuration as the part thus illustrated.

In the rotary electric machine, a stator 10 is placed at an outer peripheral side of the rotor 20, and the rotor 20 and the stator 10 are placed so as to be opposed to each other via a gap (magnetic gap) G provided therebetween in a radial direction. The stator 10 includes a stator core 11, and coils 12 disposed in the stator core 11. The rotor 20 includes a rotor core 21, and a plurality of magnetic poles 22 disposed in the rotor core 21 at intervals (regular intervals) in the circumferential direction. A shaft fitting hole 30 is formed on an inner peripheral side of the rotor core 21 along an axial direction. When a rotor shaft 16 is fitted in the shaft fitting hole 30 by press fitting or the like, for example, the rotor shaft 16 is fixed to the rotor 20. The rotor shaft 16 is supported rotatably relative to a case (not shown) through a bearing (not shown) or the like, so that the rotor 20 and the rotor shaft 16 are rotatable relative to the stator 10.

Each of the plurality of magnetic poles 22 is configured such that: magnet insertion holes 23a, 23b are formed in the rotor core 21 along the axial direction; and permanent magnets 22a, 22b are inserted into the magnet insertion holes 23a, 23b along the axial direction, so as to be embedded in the rotor core 21. One magnetic pole 22 is constituted by a pair of permanent magnets 22a, 22b. In an example of FIG. 1, the permanent magnets 22a, 22b are placed in a V-shape so that magnetization directions of the permanent magnets 22a, 22b are inclined relative to the radial direction along the circumferential direction, and opposite ends of the magnetic pole 22 are placed radially outside the central part of the magnetic pole 22. However, the shape of the permanent magnets 22a, 22b (the magnet insertion holes 23a, 23b) may be shapes other than the V-shape. As illustrated in FIG. 1, in the rotor 20, a direction of a magnet magnetic flux passing through a circumferentially central position (a valley position of the V-shape) of each of the magnetic poles 22 is assumed as a d-axis (a magnetic-flux axis), and a position between magnetic poles 22 adjacent to each other in the circumferential direction (a position displaced from the d-axis by 90° in terms of an electrical angle) is assumed as a q-axis (a torque axis).

Refrigerant passages through which a liquid refrigerant to cool down the rotor 20 and the stator 10 passes are formed in the rotor shaft 16 and the rotor core 21. The refrigerant passages are roughly classified to a shaft refrigerant passage 17 formed in the rotor shaft 16, and a core refrigerant passage formed in the rotor core 21. The shaft refrigerant passage 17 is a hole that passes through a shaft center of the rotor shaft 16. As illustrated in FIG. 2, the shaft refrigerant passage 17 extends from one end of the rotor shaft 16 to a generally center of the rotor shaft 16, and is then branched in the radial direction so as to extend to an inner circumferential end of the rotor core 21.

The core refrigerant passage includes an inlet passage 40, first magnet cooling passages 41a, 41b, second magnet cooling passages 42a, 42b, communicating passages 44a, 44b, and an outlet passage 43. The inlet passage 40 is formed so as to radially extend from the inner peripheral end of the rotor core 21 to a position on an inner peripheral side relative to the magnetic pole 22 (the permanent magnets 22a, 22b), so that a radially inner end part of the inlet passage 40 communicates with the shaft refrigerant passage 17. In the example of FIG. 1, a plurality of inlet passages 40 (the same number as the number of magnetic poles 22) is formed at intervals (regular intervals) in the circumferential direction, and a circumferential position of each of the inlet passages 40 corresponds to a central position of each of the magnetic poles 22. That is, each of the inlet passages 40 extends along the d-axis.

The outlet passage 43 is formed so as to radially extend from a position on an inner peripheral side relative to the magnetic pole 22 toward an outer circumferential end of the rotor core 21, so that a radially outer end part of the outlet passage 43 communicates with the gap G between the rotor 20 and the stator 10. In the example of FIG. 1, a plurality of outlet passages 43 (the same number as the number of magnetic poles 22) is formed at intervals (regular intervals) in the circumferential direction, and a circumferential position of each of the outlet passages 43 corresponds to a position between magnetic poles 22 adjacent in the circumferential direction. That is, each of the outlet passages 43 extends along the q-axis, and is formed so as to be displaced from each of the inlet passages 40 in the circumferential direction.

The same number of first and second magnet cooling passages 41a, 42a as the number of permanent magnets 22a is provided so that the first and second magnet cooling passages 41a, 42a correspond to the permanent magnets 22a. The first and second magnet cooling passages 41a, 42a are formed peripherally inside the permanent magnet 22a. The first and second magnet cooling passages 41a, 42a extend along the axial direction in parallel to the permanent magnet 22a, and the first magnet cooling passage 41a and the second magnet cooling passage 42a are placed at an interval in that width direction of the permanent magnet 22a which is perpendicular to the axial direction and a magnetization direction of the permanent magnet 22a. The first magnet cooling passage 41a is placed on a side closer to the d-axis than the second magnet cooling passage 42a, and a radial position of the first magnet cooling passage 41a is placed radially inside a radial position of the second magnet cooling passage 42a. Similarly, the first and second magnet cooling passages 41b, 42b extend along the axial direction in parallel to the permanent magnet 22b, and placed peripherally inside the permanent magnet 22b. The first magnet cooling passage 41b and the second magnet cooling passage 42b are placed at an interval in that width direction of the permanent magnet 22b which is perpendicular to the axial direction and a magnetization direction of the permanent magnet 22b. The first magnet cooling passage 41b is placed on a side closer to the d-axis than the second magnet cooling passage 42b, and a radial position of the first magnet cooling passage 41b is placed radially inside a radial position of the second magnet cooling passage 42b.

The same number of communicating passages 44a as the number of permanent magnets 22a is provided so that the communicating passages 44a correspond to the permanent magnets 22a, and the communicating passages 44a are formed peripherally inside the permanent magnets 22a. A radial position of the communicating passage 44a is a position partially overlapping with the radial position of the first magnet cooling passage 41a and the radial position of the second magnet cooling passage 42a. Similarly, the communicating passages 44b are formed peripherally inside the permanent magnets 22b. A radial position of the communicating passage 44b is a position partially overlapping with the radial position of the first magnet cooling passage 41b and the radial position of the second magnet cooling passage 42b.

As illustrated in FIG. 2, axially inner end parts of the first magnet cooling passages 41a, 41b communicate with radially outer end parts of the inlet passages 40. Axially inner end parts of the second magnet cooling passages 42a, 42b communicate with radially inner end parts of the outlet passages 43. An axially outer end part of the first magnet cooling passage 41a communicates with the communicating passage 44a, and an axially outer end part of the second magnet cooling passage 42a communicates with the communicating passage 44a. Hereby, the first magnet cooling passage 41a communicates with the second magnet cooling passage 42a via the communicating passage 44a. Similarly, axially outer end parts of the first and second magnet cooling passages 41b, 42b communicate with the communicating passage 44b, so that the first magnet cooling passage 41b communicates with the second magnet cooling passage 42b via the communicating passage 44b.

Figure 3:
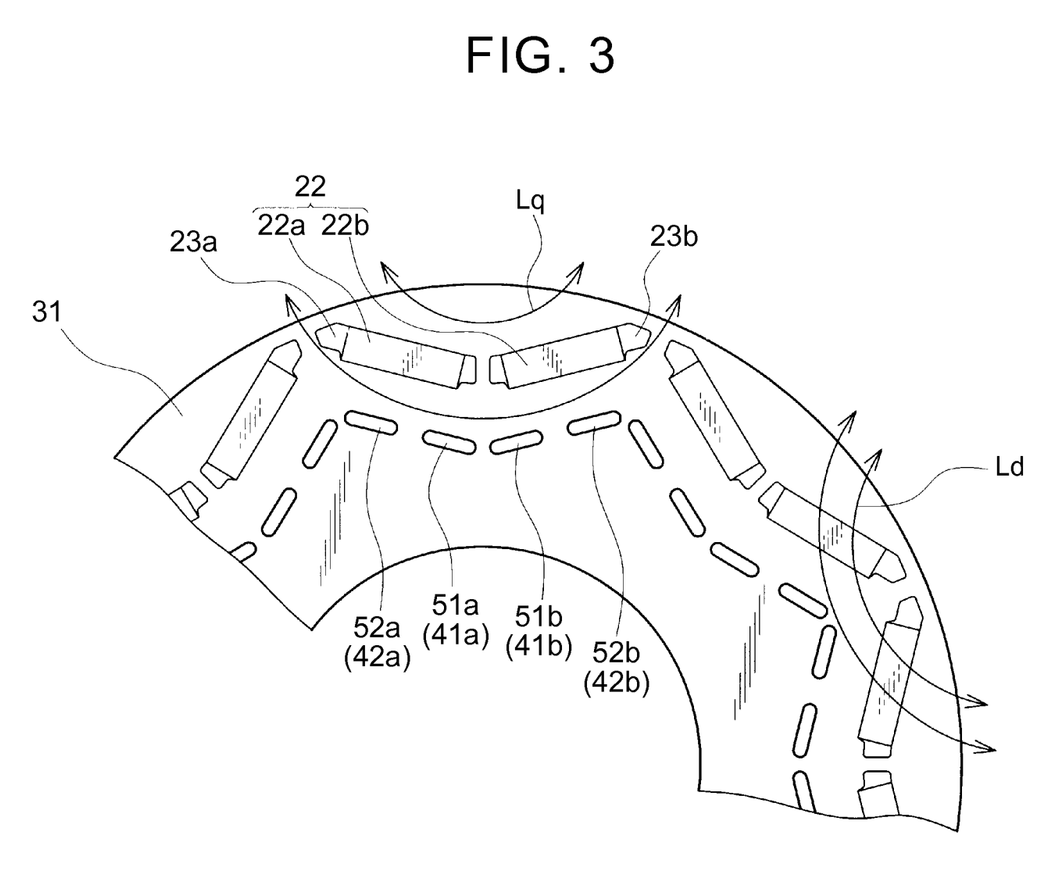
FIG. 3 is a view illustrating an exemplary configuration of a first core plate 31.

The rotor core 21 is configured such that several types of core plates (electromagnetic steel sheets) 31 to 34 as illustrated in FIGS. 3 to 6 are laminated in the axial direction. The magnet insertion holes 23a, 23b are formed in all the core plates 31 to 34. As illustrated in FIG. 3, in the first core plate 31, first and second through holes 51a, 52a are formed peripherally inside the magnet insertion hole 23a, and first and second through holes 51b, 52b are formed peripherally inside the magnet insertion hole 23b. In an example of FIG. 3, the first and second through holes 51a, 52a have a slit shape with its longitudinal direction being along a width direction of the permanent magnet 22a, and the first and second through holes 51b, 52b have a slit shape with its longitudinal direction being along a width direction of the permanent magnet 22b. In a plurality of first core plates 31 laminated in the axial direction, the first magnet cooling passage 41a is formed by a plurality of first through holes 51a being connected to each other in the axial direction, and the second magnet cooling passage 42a is formed by a plurality of second through holes 52a being connected to each other in the axial direction. Similarly, the first magnet cooling passage 41b is formed by a plurality of first through holes 51b being connected to each other in the axial direction, and the second magnet cooling passage 42b is formed by a plurality of second through holes 52b being connected to each other in the axial direction. The inlet passage 40, the communicating passages 44a, 44b, and the outlet passage 43 are not formed in the first core plate 31.

Figure 4:
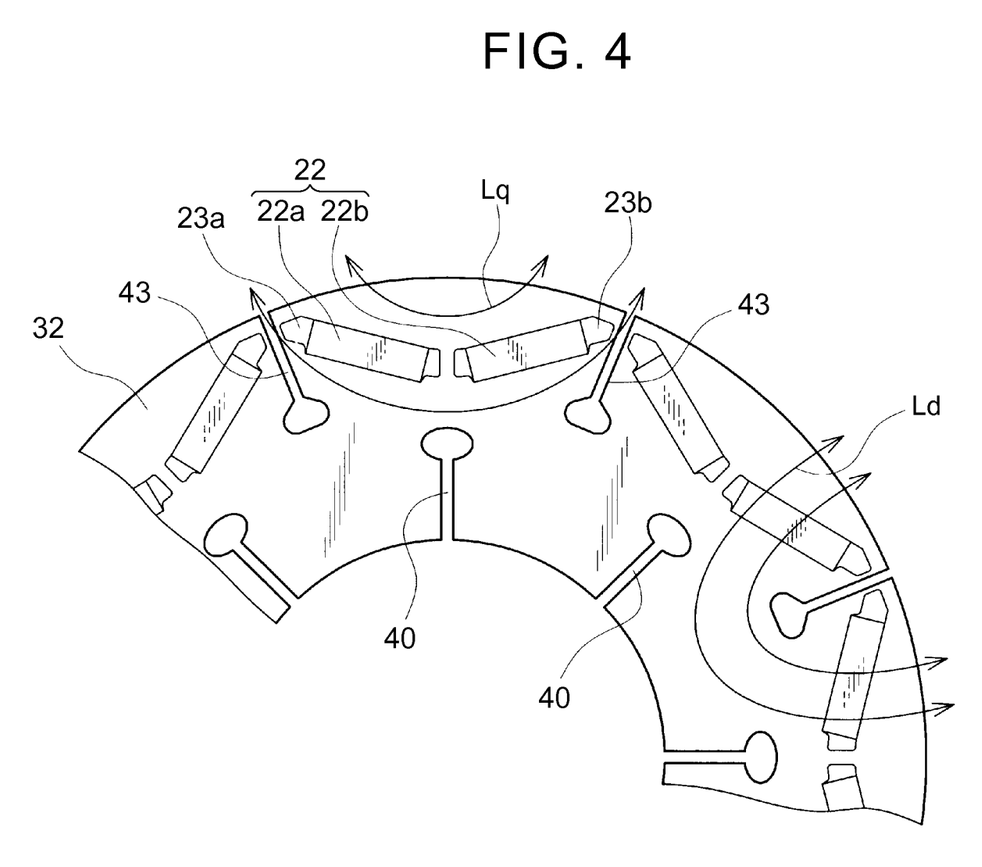
FIG. 4 is a view illustrating an exemplary configuration of a second core plate 32.

As illustrated in FIG. 4, the second core plate 32 is configured such that a plurality of inlet passages (slots) 40 and a plurality of outlet passages (slots) 43 are formed, but the first through holes 51a, 51b (the first magnet cooling passages 41a, 41b), the second through holes 52a, 52b (the second magnet cooling passages 42a, 42b), and the communicating passages 44a, 44b are not formed. In an example of FIG. 4, the radially outer end part of the inlet passage 40 has a shape expanded in the circumferential direction so as to be connected to the first magnet cooling passages 41a, 41b, and the radially inner end part of the outlet passage 43 has a shape expanded in the circumferential direction so as to be connected to the second magnet cooling passages 42a, 42b.

Figure 5:
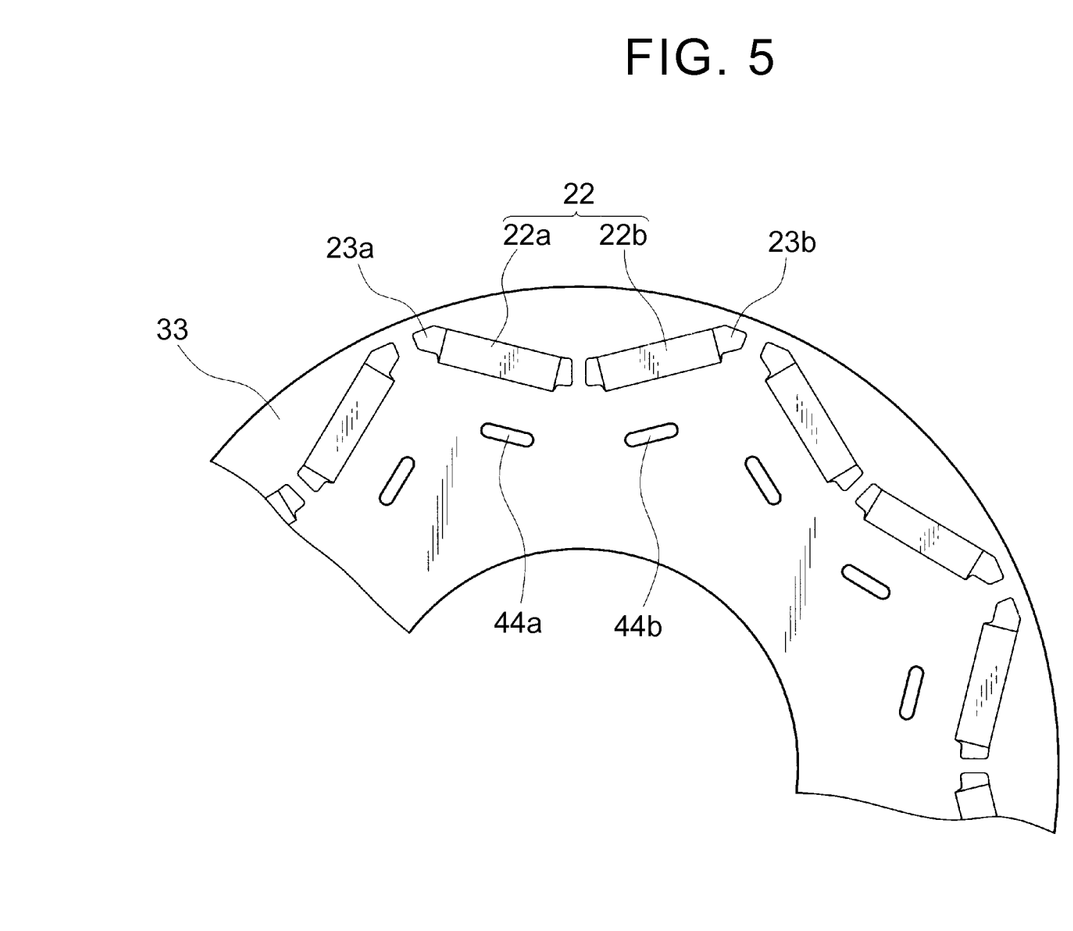
FIG. 5 is a view illustrating an exemplary configuration of a third core plate 33.
Figure 6:
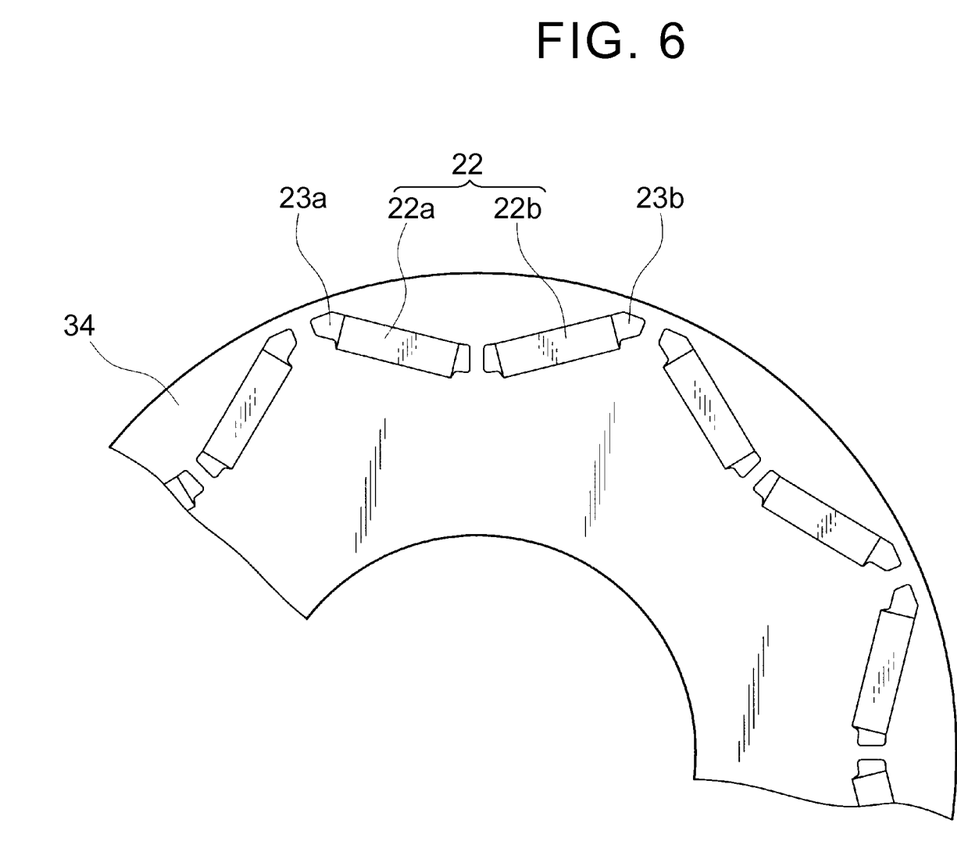
FIG. 6 is a view illustrating an exemplary configuration of a fourth core plate 34.

As illustrated in FIG. 5, the third core plate 33 is configured such that a plurality of communicating passages (communicating holes) 44a, 44b are formed, but the inlet passage 40, the outlet passage 43, the first through holes 51a, 51b, and the second through holes 52a, 52b are not formed. In an example of FIG. 5, the communicating hole 44a has a slit shape with its longitudinal direction being along the width direction of the permanent magnet 22a, and the communicating hole 44b has a slit shape with its longitudinal direction being along the width direction of the permanent magnet 22b. Further, as illustrated in FIG. 6, the fourth core plate 34 is configured such that the inlet passage 40, the outlet passage 43, the first through holes 51a, 51b, the second through holes 52a, 52b, and the communicating passages 44a, 44b are not formed.

As illustrated in FIG. 2, the rotor core 21 is configured such that the fourth core plate 34, the third core plate 33, a plurality of first core plates 31, the second core plate 32, a plurality of first core plates 31, the third core plate 33, and the fourth core plate 34 are laminated in this order from one side to the other side in the axial direction. The second core plate 32 is placed at an axially central position of the rotor core 21, and the plurality of first core plates 31, the third core plates 33, and the fourth core plates 34 are laminated symmetrically with the second core plate 32 at the axially central position being sandwiched therebetween. Here, the second core plate 32 is not needed to be placed exactly in the axially central position in the axial direction, and it may be placed in a generally central position in the axial direction.

In the rotor core 21, an axial position at which the second core plate 32 is laminated is just one surface (one place) at the axially central position. That is, a plurality of outlet passages 43 is provided in the circumferential direction, but an axial position thereof is placed on just one surface (one place) at the axially central position of the rotor core 21. Similarly, a plurality of inlet passages 40 is provided in the circumferential direction, but an axial position thereof is placed on just one surface (one place) at the axially central position of the rotor core 21. That is, only one second core plate 32 is laminated at the axially central position of the rotor core 21.

The plurality of first core plate 31 is laminated on one side and on the other side in the axial direction (on opposite sides in the axial direction) of the second core plate 32, so that the opposite sides of the second core plate 32 in the axial direction are sandwiched by the first core plates 31. That is, the first core plates are placed on the opposite sides of the second core plate in the axial direction. With such an arrangement, the inlet passages 40 of the second core plate 32 is axially connected to the first through holes 51a, 51b of an innermost first core plate 31 in the axial direction, and the outlet passages 43 of the second core plate 32 is axially connected to the second through holes 52a, 52b of the innermost first core plate 31 in the axial direction. The first magnet cooling passages 41a, 41b are formed on opposite sides of the inlet passages 40 in the axial direction, and the second magnet cooling passages 42a, 42b are formed on opposite sides of the outlet passages 43 in the axial direction.

The third core plate 33 is laminated axially outside the first core plates 31 thus laminated, so that the plurality of first core plates 31 is sandwiched between the third core plate 33 and the second core plate 32 in the axial direction. At this time, the communicating passage 44a of the third core plate 33 is axially connected to the first and second through holes 51a, 52a of an outermost first core plate 31 in the axial direction, and the communicating passage 44b of the third core plate 33 is axially connected to the first and second through holes 51b, 52b of the outermost first core plate 31 in the axial direction. Axial positions of the communicating passages 44a, 44b are placed axially outside an axial position of the inlet passage 40 and an axial position of the outlet passage 43. In the axial direction, the first magnet cooling passages 41a, 41b are each formed between the inlet passage 40 and each of the communicating passages 44a, 44b, and the second magnet cooling passages 42a, 42b are each formed between the outlet passage 43 and each of the communicating passages 44a, 44b. The fourth core plate 34 is laminated an axially outside the third core plate 33, so that the fourth core plate 34 is placed at an outermost position in the axial direction. The communicating passages 44a, 44b are formed at axial ends of the rotor core 21.

A cooling oil as a liquid refrigerant is supplied to the shaft refrigerant passage 17 in the rotor shaft 16. Due to a centrifugal force at the time of rotation of the rotor, the cooling oil in the shaft refrigerant passage 17 flows into the inlet passages 40 at the axially central position of the rotor core 21. The cooling oil thus flowing into the inlet passages 40 is supplied to the first magnet cooling passages 41a, 41b formed on the opposite sides of the inlet passages 40 in the axial direction, and then flows through the first magnet cooling passages 41a, 41b toward an axially outer side, as indicated by arrows a in FIG. 2. Further, the cooling oil in the first magnet cooling passages 41a, 41b flows into the second magnet cooling passages 42a, 42b via the communicating passages 44a, 44b at the axial ends of the rotor core 21, and then flows through the second magnet cooling passages 42a, 42b toward an axially inner side, as indicated by arrows b in FIG. 2. When the cooling oil flows through the first magnet cooling passages 41a, 41b and the second magnet cooling passages 42a, 42b in a reciprocating manner in the axial direction, the permanent magnets 22a, 22b are cooled down. The cooling oil in the second magnet cooling passages 42a, 42b flows inwardly in the axial direction toward the outlet passage 43, and is then discharged to the gap G between the rotor 20 and the stator 10 through the outlet passage 43 at the axially central position of the rotor core 21, as indicated by arrows c in FIG. 2. When the cooling oil flows through the gap G as such, it is also possible to cool down the outer peripheral surface of the rotor core 21 and the stator 10 (the coils 12). The cooling oil in the gap G is then discharged outside from axial ends of the gap G.

Figure 7:
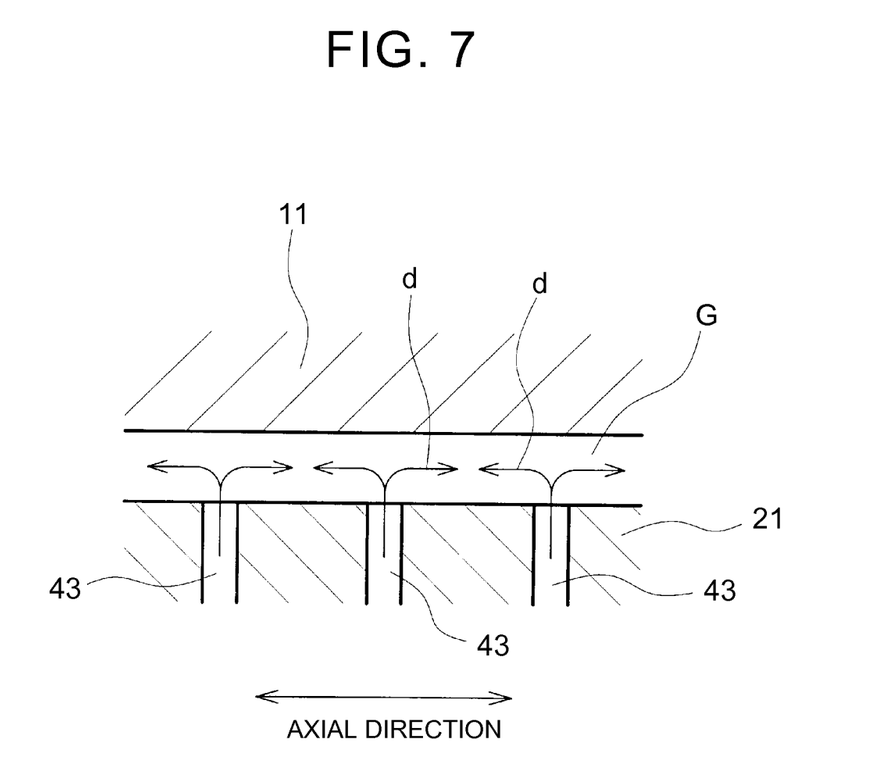
FIG. 7 is a view to describe flows of cooling oils in a case where outlet passages 43 are formed on several surfaces in an axial direction.

Here, assume a case where a plurality of outlet passages 43 is formed at several parts in the axial direction and the cooling oil is discharged to the gap G from the several parts in the axial direction. In this case, as indicated by arrows d in FIG. 7, in a region sandwiched between the outlet passages 43 adjacent to each other in the axial direction, axial flows of cooling oils from respective outlet passages 43 interfere with each other, so that the cooling oils are easy to be retained, which obstructs discharge of the cooling oils from the axial ends of the gap G. As a result, the cooling oil retained in the gap G serves as a rotational resistance to the rotor, which increases a drag loss.

In contrast, in the present embodiment, the outlet passages 43 are formed only on one surface (one place) at the central position of the rotor core 21 in the axial direction, so that the cooling oil flows out to the gap G only from the one surface (one place) at the axially central position of the rotor core 21. Accordingly, axial flows of the cooling oil in the gap G are just axially outward flows toward both ends from the central position, as indicated by the arrows c in FIG. 2, which can prevent the interference between the axial flows of the cooling oil. Hereby, it is possible to immediately discharge the cooling oil outside from the axial ends of the gap G without the cooling oil being retained in the gap G. As a result, it is possible to reduce a drag loss at the time when the rotor rotates. Here, the outlet passages 43 are not needed to be placed exactly in the central position in the axial direction, and they may be placed in a generally central position in the axial direction.

Further, the cooling oil flows into the first and second magnet cooling passages 41a, 41b, 42a, 42b extending axially between the axial ends of the rotor core 21. This makes it possible to cool down the permanent magnets 22a, 22b entirely in the axial direction, and to improve cooling performance of the permanent magnets 22a, 22b. At this time, the cooling oil immediately flows inwardly in the axial direction toward the outlet passage 43 at the axially central portion from the communicating passages 44a, 44b at the axial ends, as indicated by the arrows b in FIG. 2 without the cooling oil being retained in the second magnet cooling passages 42a, 42b. Further, the inlet passages 40 are formed on only one surface (one place) at the central position of the rotor core 21 in the axial direction, so that the cooling oil flows into the first magnet cooling passages 41a, 41b only from the one surface (one place) at the axially central position of the rotor core 21. Hereby, the cooling oil immediately flows outwardly in the axial direction toward the communicating passages 44a, 44b at the axial ends from the inlet passage 40 at the axially central part as indicated by the arrows a in FIG. 2 without the cooling oil being retained in the first magnet cooling passages 41a, 41b. Here, the inlet passages 40 are not needed to be placed exactly in the central position in the axial direction, and they may be placed in a generally central position in the axial direction.

Further, as indicated by the arrows a, b in FIG. 2, when the cooling oil flows through the first magnet cooling passages 41a, 41b and the second magnet cooling passages 42a, 42b in a reciprocating manner in the axial direction, it is possible to further improve the cooling performance of the permanent magnets 22a, 22b. At this time, the radial positions of the second magnet cooling passages 42a, 42b communicating with the outlet passages 43 are set radially outside the radial positions of the first magnet cooling passages 41a, 41b communicating with the inlet passages 40, so that the cooling oil can flow efficiently due to the centrifugal force at the time when the rotor rotates.

Further, as illustrated in FIGS. 3, 4, the inlet passage 40, the first magnet cooling passages 41a, 41b, the second magnet cooling passages 42a, 42b, and the outlet passage 43 do not obstruct a d-axis magnetic path Ld and a q-axis magnetic path Lq. Accordingly, it is possible to restrain magnetic resistances of the d-axis magnetic path Ld and the q-axis magnetic path Lq to be low. As a result, both a magnet torque and a reluctance torque can be utilized effectively, thereby making it possible to increase a torque of the rotor 20 effectively.

In the above embodiment, the second core plate 32 is placed at the axially central position of the rotor core 21, and the outlet passages 43 are formed at the axially central position of the rotor core 21. However, in the present embodiment, the second core plate 32 may be placed at a position slightly displaced from the central position of the rotor core 21 in the axial direction, and the outlet passages 43 may be formed at a position slightly displaced from the central position of the rotor core 21 in the axial direction. Even in this case, it is possible to prevent the interference between axial flows of the cooling oil in the gap G.

In the above embodiment, the inlet passage 40 is formed in the second core plate 32 so as to be placed at the axially central position of the rotor core 21. However, in the present embodiment, the inlet passage 40 may be formed in a first core plate 31 adjacent to the second core plate 32 in the axial direction, so that the inlet passage 40 is formed at a position slightly displaced from the central position of the rotor core 21 in the axial direction.

In the above embodiment, the first magnet cooling passages 41*a*, 41*b* and the second magnet cooling passages 42*a*, 42*b* are formed in the rotor core 21 (the first core plate 31) as magnet cooling passages, and the cooling oil flows through the first magnet cooling passages 41*a*, 41*b* and the second magnet cooling passages 42*a*, 42*b* in a reciprocating manner in the axial direction. However, in the present embodiment, the magnet cooling passages 41*a*, 41*b* and the communicating passages 44*a*, 44*b* can be omitted, and the cooling oil may not be reciprocated in the axial direction. As an exemplary configuration in that case, the inlet passages 40 communicating with the shaft refrigerant passage 17 and the magnet cooling passages 42*a*, 42*b* are formed in the third core plates 33 (at the axial ends of the rotor core 21). The cooling oil flowing into the inlet passages 40 at the axial ends of the rotor core 21 flows inwardly in the axial direction through the magnet cooling passages 42*a*, 42*b*, and is discharged to the gap G between the rotor 20 and the stator 10 through the outlet passages 43 at the axially central position of the rotor core 21.

The embodiment of the present invention has been explained as above, but it is needless to say that the present invention is not limited to the above embodiment at all and may be performable in various embodiments as long as the various embodiments are not beyond the gist thereof.

What is claimed is:

1. A rotor for a rotary electric machine, a stator of the rotary electric machine being to be placed radially outside the rotor so as to be opposed to the rotor via a gap defined between the rotor and the stator, the rotary electric machine including a rotor shaft, the rotor shaft being fixed to an inner peripheral side of the rotor, the rotor shaft having a shaft refrigerant passage, the rotor comprising:
a rotor core having a plurality of core refrigerant passages, the core refrigerant passage each including:
an inlet passage configured such that a liquid refrigerant flows into the inlet passage from the shaft refrigerant passage;
a magnet cooling passage configured such that the liquid refrigerant flows into the magnet cooling passage from the inlet passage, the magnet cooling passage extending in an axial direction; and
an outlet passage configured to flow the liquid refrigerant from the magnet cooling passage to the gap, an axial position of the outlet passage in the rotor core being at one place at a central position in the axial direction; and
magnets disposed in the rotor core along the axial direction.

2. The rotor according to claim 1, wherein
the magnet cooling passage communicates with the inlet passage,
the magnet cooling passage has:
a first magnet cooling passage extending in the axial direction;
a second magnet cooling passage communicating with the outlet passage and extending in the axial direction,
the core refrigerant passage has a communicating passage, the first magnet cooling passage communicates with the second magnet cooling passage via the communicating passage, and
an axial position of the communicating passage is placed axially outside an axial position of the inlet passage and an axial position of the outlet passage.

3. The rotor according to claim 2, wherein
the axial position of the inlet passage in the rotor core is at one place at a central position in the axial direction.

4. The rotor according to claim 2, wherein
a radial position of the second magnet cooling passage is placed radially outside a radial position of the first magnet cooling passage.

5. The rotor according to claim 1, wherein
the rotor core includes a plurality of first core plates,
the first core plate each has a through hole, and
the plurality of first core plates is laminated in the axial direction, such that the through holes of the plurality of first core plates are connected to each other in the axial direction so as to form the magnet cooling passage.

6. The rotor according to claim 5, wherein
the rotor core includes a second core plate,
the second core plate has the outlet passage, and
the first core plates are placed on both sides of the second core plate in the axial direction.

7. The rotor according to claim 1, wherein
the rotor core includes a plurality of core plates, and
one of the core plates which has the outlet passage is placed at an axially central position of the rotor core.

8. The rotor according to claim 3, wherein
the rotor core includes a plurality of core plates, and
one of the core plates which has the inlet passage is placed at an axially central position of the rotor core.

* * * * *